(12) United States Patent
Kamdar et al.

(10) Patent No.: US 7,599,690 B2
(45) Date of Patent: Oct. 6, 2009

(54) PRE-CONNECTION SYSTEM READINESS FOR RECEIVING VOICE AND DATA COMMANDS

(75) Inventors: Hitan S. Kamdar, Utica, MI (US); Russell A. Patenaude, Macomb Township, MI (US); Anthony J. Sumcad, Southfield, MI (US); Shpetim S. Veliu, Livonia, MI (US); Brad T. Reeser, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 695 days.

(21) Appl. No.: 10/909,500

(22) Filed: Aug. 2, 2004

(65) Prior Publication Data

US 2006/0025173 A1    Feb. 2, 2006

(51) Int. Cl.
    *H04W 4/00* (2009.01)
(52) U.S. Cl. ............... 455/427; 455/404.1; 455/404.2; 455/414.1; 455/414.2; 455/414.3; 455/521
(58) Field of Classification Search .......... 455/404.1, 455/404.2, 414.1, 414.2, 414.3, 456.1–457, 455/521, 427; 701/35; 340/425.5, 436; 379/265.01, 379/265.05, 265.11, 265.1, 266.02
See application file for complete search history.

(56) References Cited

U.S. PATENT DOCUMENTS

| 4,426,691 | A  | * | 1/1984  | Kawasaki ............... 369/21 |
| 5,193,141 | A  | * | 3/1993  | Zwern .................. 704/200 |
| 5,742,666 | A  | * | 4/1998  | Alpert ................ 455/404.2 |
| 5,890,061 | A  | * | 3/1999  | Timm et al. .......... 455/404.2 |
| 6,008,723 | A  | * | 12/1999 | Yassan ................. 340/438 |
| 6,324,393 | B1 | * | 11/2001 | Doshay ............... 455/404.2 |
| 6,356,633 | B1 | * | 3/2002  | Armstrong .......... 379/265.11 |
| 6,593,848 | B1 | * | 7/2003  | Atkins, III .......... 340/425.5 |
| 6,630,884 | B1 | * | 10/2003 | Shanmugham ........ 340/436 |
| 2001/0005804 | A1 | * | 6/2001 | Rayner ................... 701/35 |

* cited by examiner

Primary Examiner—Stephen M D'Agosta

(57) ABSTRACT

A pre-connection readiness system employs a telematics unit and a telematics call center. The telematics unit receives and stores pre-connection user information prior to a connection between the telematics unit and the telematics call center. The telematics unit and the telematics call center exchange the pre-connection user information subsequent to the connection between the telematics unit and the telematics call center.

19 Claims, 5 Drawing Sheets

PRE-CONNECTION SYSTEM READINESS FOR RECEIVING VOICE AND DATA COMMANDS

FIELD OF THE INVENTION

The present invention generally relates to techniques for connecting a telematics unit in a vehicle to a telematics call center. The present invention specifically relates to facilitating a system readiness for receiving voice and data commands prior to a connection being established between a telematics unit in a vehicle and a telematics call center.

BACKGROUND OF THE INVENTION

Currently, a user of a vehicle telematics system initiates a connection from the vehicle to a telematics call center whereby the user has to wait for the connection to be established before the user can speak to the call center or direct the system to transmit data to the call center. This connection process can take as few as a couple of seconds to as long as a couple of minutes, particularly if the hardware of the system implements one or more connection retries. In most cases, the connection time is an inconvenience to the user and is viewed as wasted time or "dead time." Occasionally, the connection time may be more important and delays may have unintended consequences. For example, a user experiencing a heart attack may have only a few seconds to ask for help before the user loses his or her ability to speak. Thus, a connection time greater than these few seconds can be very detrimental to the ability of the call center to obtain timely help for the user.

The present invention advances the state of the art in system readiness of telematics systems.

SUMMARY OF THE INVENTION

One form of the present invention is a pre-connection readiness system employing a telematics unit and a telematics call center. The telematics unit receives and stores pre-connection user information prior to a connection between the telematics unit and the telematics call center. The telematics unit and the telematics call center exchange the pre-connection user information subsequent to the connection between the telematics unit and the telematics call center.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
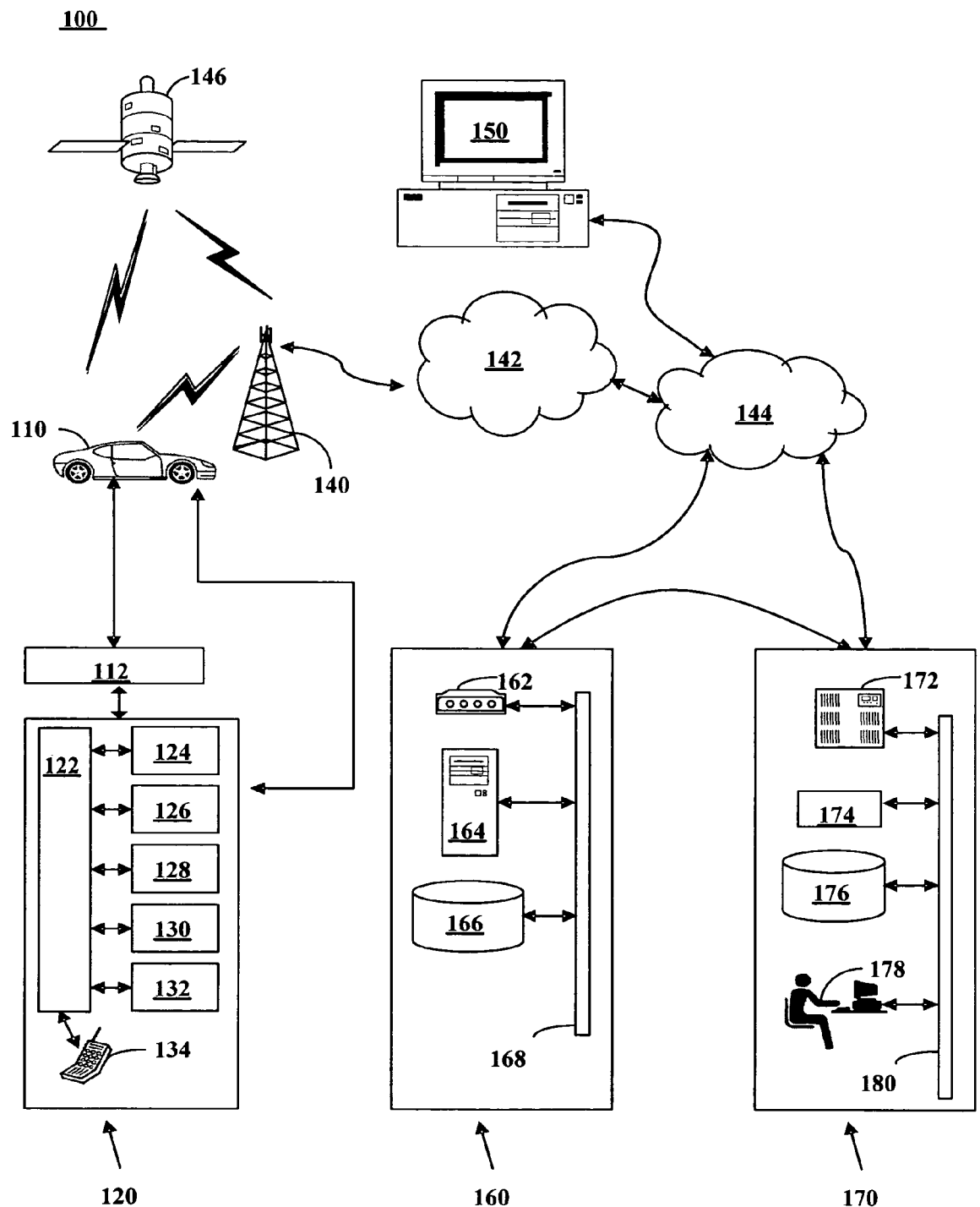
FIG. 1 illustrates an operating environment for a system for controlling vehicle modules in accordance with the present invention.

FIG. 1 illustrates one embodiment of a mobile vehicle communication system ("MVCS") 100 for sending pre-connection user information. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization ("ISO") Standard 9141, ISO Standard 11898 for high-speed applications, ISO Standard 11519 for lower speed applications, and Society of Automotive Engineers Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data are received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In another embodiment, the call center is a voice call center, providing verbal communications between an advisor in the call center and a subscriber in a mobile vehicle. In yet another embodiment, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
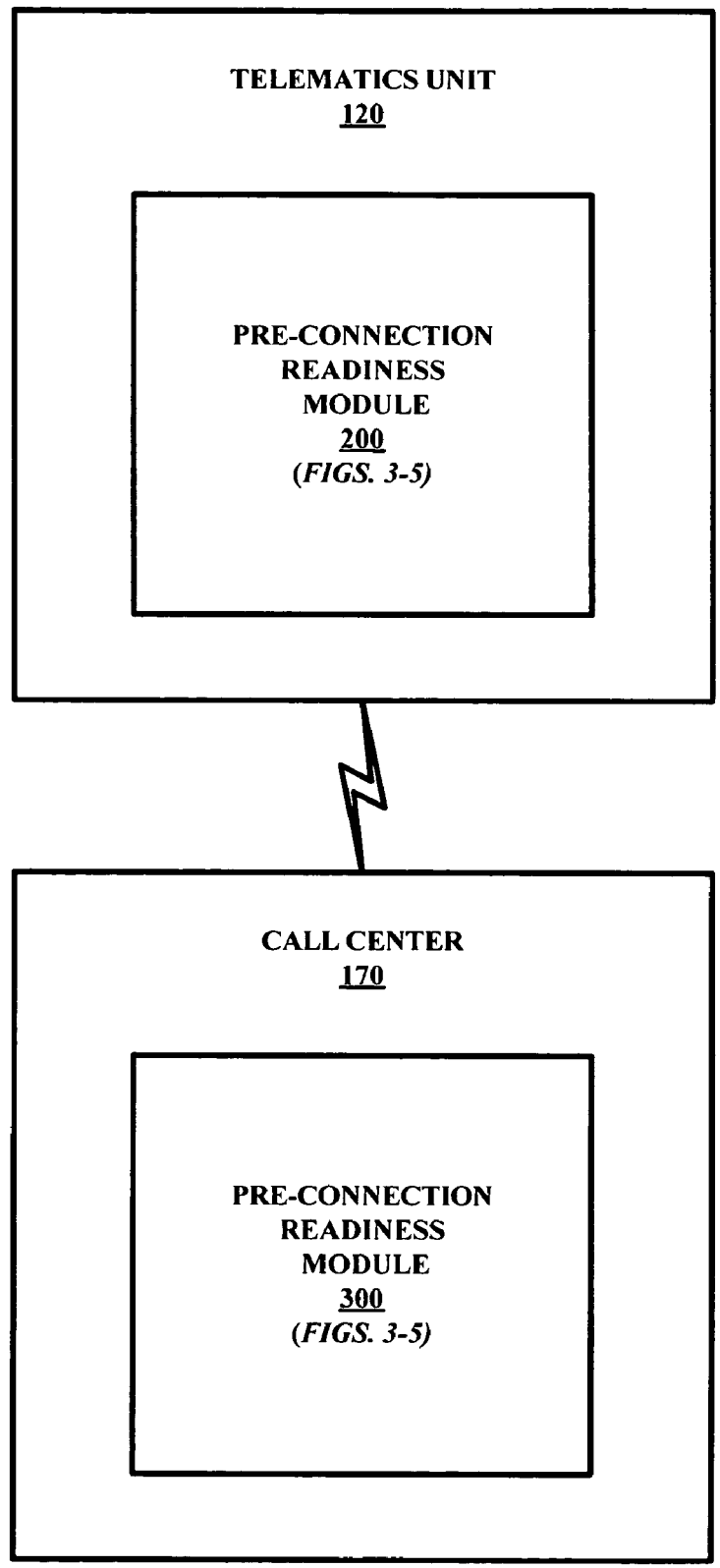
FIG. 2 illustrates a block diagram of one embodiment of a pre-connection readiness system in accordance with the present invention.

FIG. 2 illustrates a pre-connection readiness system employing a pre-connection readiness module 200 stored within telematics unit 120 (FIG. 1), and a pre-connection readiness module 300 stored within call center 170 (FIG. 1). Module 200 and module 300 are structurally configured with hardware, software, firmware, or any combination thereof to implement a pre-connection readiness method as represented by flowcharts 210 and 310 illustrated in FIG. 3. An implementation of flowchart 210 and flowchart 310 by module 200 and module 300, respectively, can be based on a conventional communication protocol and format such as, for example, SMS, CDMA, AMPS, and 802.11 or any other FCC Part 15 protocol.

In one embodiment, pre-connection user information is stored in the memory of the telematics unit, while in other embodiments, the pre-connection user information is stored in memory that is accessible to the telematics unit. In one embodiment, the pre-connection user information is stored until transmitted to the call center and then erased from the memory. In other embodiments, pre-connection user information is stored in memory until the next entry of pre-connection user information by the user, or stored in memory until overwritten by new pre-connection user information. If pre-connection user information is stored in memory until overwritten by the next entry of pre-connection user information, the stored pre-connection user information could be available to reconstruct events, or serve as a memory aide. In one example, stored pre-connection user information in a memory provides a reconstruction of events that involved a person who is no longer available to assist in reconstruction, such as kidnapping or other criminal activity, or in case of medical emergencies.

In the example of a medical emergency, a person may initiate communications with a call center 170 (FIG. 1) via a telematics unit 120 (FIG. 1) by pressing a button or by an utterance. In this example, a voice recorder may activate and the person may record an utterance, such as "Help, I'm having a heart attack." The voice recorder activates and records the utterance. Once the communication between the call center and telematics unit is established, the stored utterance is transmitted to the call center and played back, providing the utterance to an advisor 178.

Figure 3:
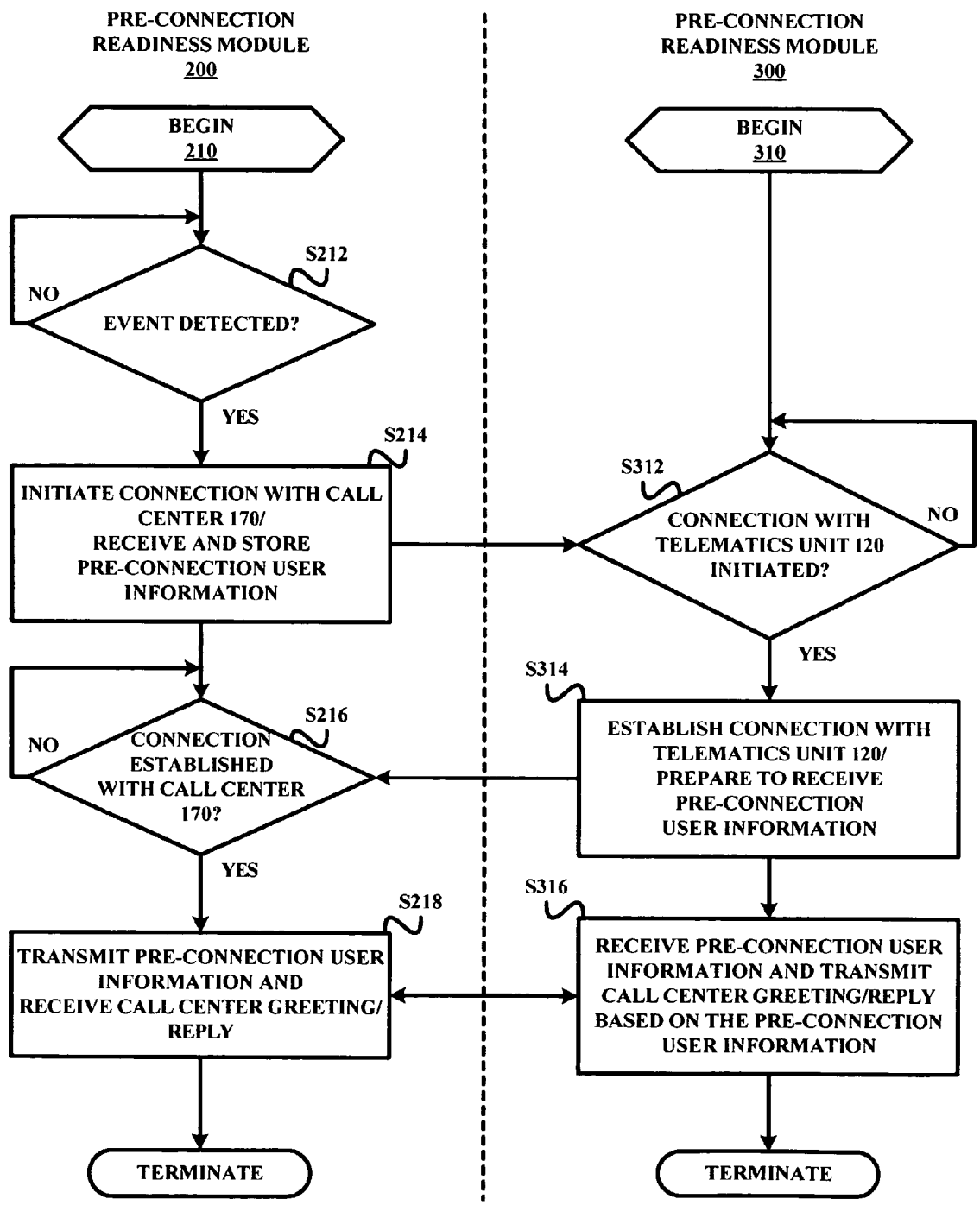
FIG. 3 illustrates flow charts representative of one embodiment of a pre-connection readiness method in accordance with the present invention.

FIG. 3 illustrates one embodiment of a method to provide telematics services in accord with the invention. At stage S212, module 200 awaits the occurrence of an event, for example, action from a user, to initiate connection with a call center, such as call center 170. In one embodiment, the action is a button push, although other actions such as a verbal command may be utilized. In one embodiment, the event is an airbag deployment event.

Upon receiving the signal during stage S212, module 200 proceeds to a stage S214 of flowchart 200 to initiate a connection with call center 170 and to receive and store pre-connection user information. To this end, module 200 transmits conventional connection signals to call center 170 while simultaneously entering telematics unit 120 into one or more conventional voice and data input modes for receiving pre-connection user information from the user. In one embodiment, module 200 enters telematics unit 120 into a conventional voice-recording mode to receive and store pre-connection user information in the form of voice commands. In another embodiment, module 200 enters telematics unit 120 into a conventional data-recording mode to receive and store pre-connection user information in the form of dual tone multi-frequency ("DTMF") tones. In another embodiment, module 200 enters telematics unit into a mode to record other user inputs, such as, for example, inputs from a user data input device such as a wireless-enabled computer, personal data assistant ("PDA") or other such device. In yet another embodiment, module 200 enters telematics unit 120 into a mode to record other user inputs from button pushes entered on, for example, a radio or other dashboard input device.

During stage S312, module 300 waits for a connection signal from telematics unit 120, such as the signal generated during S214. Upon receiving such a signal, module 300 proceeds to a stage S314 of flowchart 300 to establish the connection with telematics unit 120 and to prepare to receive pre-connection user information from telematics unit 120. Module 300 thereafter proceeds to a stage S316 of flowchart 300.

During stage S316, the call center receives the pre-connection user information. In one embodiment, the call center transmits an automated call center reply responsive to the received pre-connection user information. In one embodiment, the call center parses the pre-connection user information to determine the contents of the pre-connection user information and selects a call center reply responsive to the contents of the information.

Upon determining the connection has been established with call center 170 during a stage S216 of flowchart 200, module 200 proceeds to a stage S218 of flowchart 200 whereby module 200 and module 300 exchange pre-connection user information and a call center greeting/reply during stage S218 and S316, respectively. In one embodiment, the pre-connection user information is transmitted to an advisor (e.g., advisor 178 depicted in FIG. 1) of call center 170 via a screen dialog box involving a speech-to-text conversion. In a second embodiment, the pre-connection user information is transmitted to advisor 178 via a replicated audio playback. In a third embodiment, telematics unit 120 informs advisor 178 that the pre-connection user information is available for retrieval via a data transfer. In a fourth embodiment, the initial connection is routed to an interactive voice response ("IVR") system of call center 170, and the pre-connection user information is used as an input to the IVR system.

Flowcharts 210 and 310 are terminated upon completion of stages S218 and S316. As a result of flowcharts 210 and 310, telematics unit 120 and call center 170 can implement routines corresponding to the content of the pre-connection user information and/or the call center greeting/reply in a timely manner or in an efficient manner.

For example, a connection initiation (S212) by a user of telematics unit 120 in an emergency situation (e.g., experiencing a heart attack) allows the user to immediately request help (S214) via voice commands (e.g., "I am having a heart attack, please send help") or data inputs (e.g., a DTMF tone for signaling a heart attack or the like). In response thereto, call center 170 will establish the connection (S314) to thereby exchange the stored pre-connection user information and a call center greeting/reply (e.g., "Help is on the way") (S218 and S316). The result is the ability of call center 170 to implement emergency procedures (e.g., a call to a Public Safety Answering Point) in a timely manner on behalf of the user.

Also by example, a connection initiation (S212) by a user of telematics unit 120 for a particular service (e.g., the weather) allows the user to immediately request the service (S214) via voice commands (e.g., "weather") or data inputs (e.g., a DTMF tone for signaling a weather report). In response thereto, call center 170 will establish the connection (S314) to thereby exchange the stored pre-connection user information and a call center greeting/reply (e.g., "Hello") (S218 and S316) while call center 170 is routing the connection to a weather advisor in an efficient manner.

In yet another embodiment, pre-connection user information is collected only upon certain, predetermined and user programmable triggers, such as combinations of at least two button pushes. For example, a user may instigate storage and communication of pre-connection user information only if the "connection" button is pushed in combination with, for example, a second button on the dashboard. In one embodiment, the connection button is disposed upon a rear-view mirror. Thus, the connection button, in one embodiment, is pressed with the cruise control to activate collection and communication of the pre-communication user information.

In another embodiment, upon receiving the pre-connection user information, the call center may route the communication to an appropriate destination in response to the contents of the pre-connection user information. In one embodiment, users are provided with a list of pre-connection user information commands. In such embodiments, when the call center receives pre-connection user information that includes an entry from the list of pre-connection user information commands, the pre-connection user information is routed to an appropriate destination. For example, in one embodiment, the list includes an entry of "tickets" to connect to a movie ticket ordering service. When the call center receives pre-connection user information comprising the word "tickets," the communication is routed to a ticket department. In another example, a user provides pre-connection user information including the word "weather," and the pre-connection user information is routed to a weather department.

Those having ordinary skill in the art will appreciate various advantages of the present invention. First, as provided by one example, the present invention facilitates queued pre-connections commands (voice or data) in an emergency situation that overcomes the drawback of a user having to wait until the connection is established between telematics unit 120 and call center 170. Second, as provided by another example, the present invention facilitates an operation of call center 170 as a smart call center for efficiently routing service requests. Third, the present invention facilitates a use of telematics unit 120 as a black box recorder containing pre-connection user information that otherwise would not be available if a user had to wait until the connection is established between telematics unit 120 and call center 170. Finally, a greeting/reply by call center 170 is individualized to the pre-connection user information (e.g., "Help is approximately fifteen minutes away" or "Hello, the weather for today will be clear at a temperature of 70°"").

Figure 4:
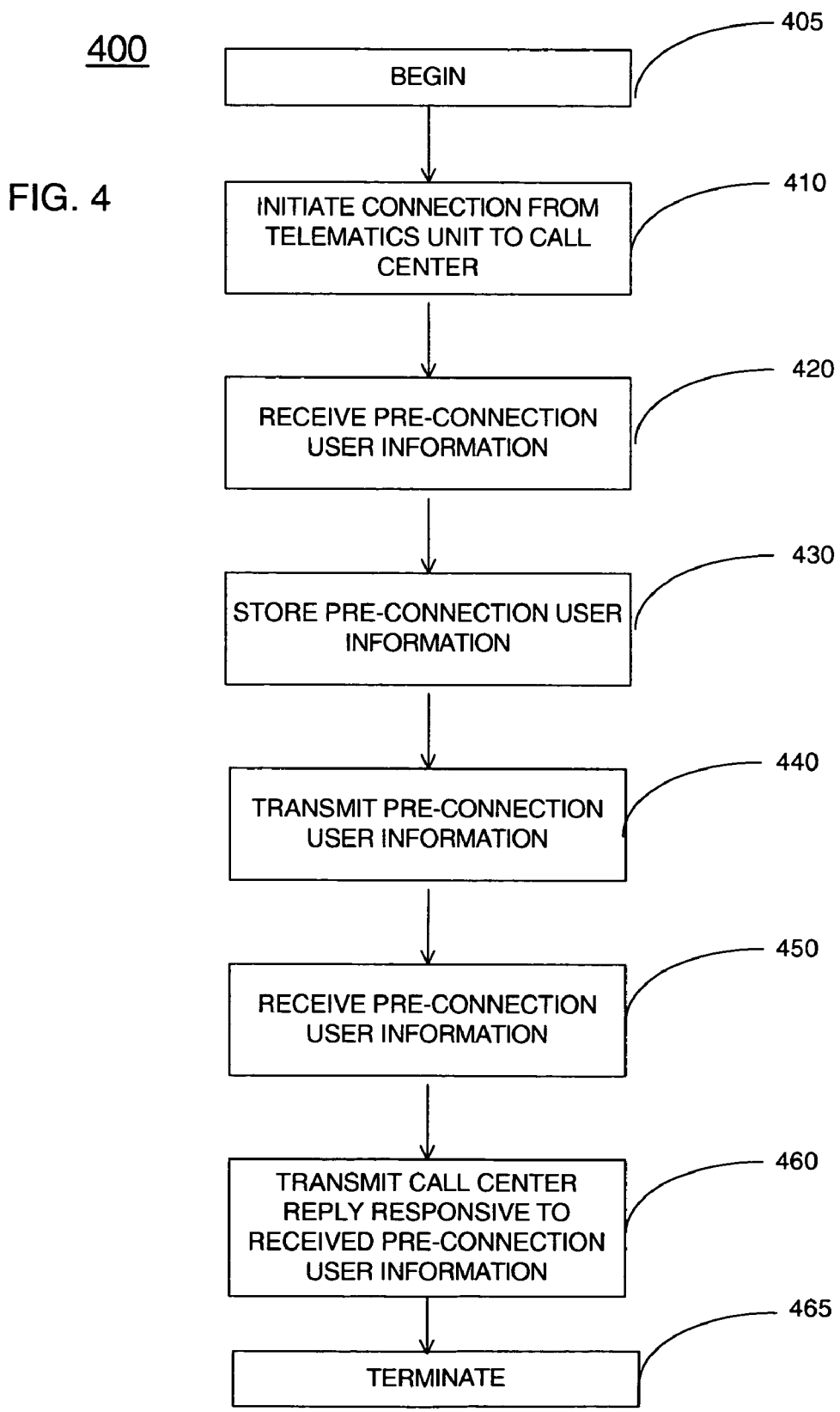
FIG. 4 illustrates one embodiment of a method of establishing a connection between a telematics unit and a call center, in accordance with one embodiment of the invention.

FIG. 4 illustrates an embodiment of a method 400 to establish a connection between a telematics unit and a call center in accordance with one aspect of the invention.

Method 400 begins at block 405 and continues to block 410, where a telematics unit 120 initiates a wireless communication connection with a call center 170.

At block 420, the telematics unit receives pre-connection user information. In one embodiment, telematics unit 120 stores the pre-connection user information during block 430. At block 440, the pre-connection user information is transmitted to the call center, where the pre-connection user information is received at block 450.

At block 460, the call center transmits a call center reply in response to the received pre-connection user information. The call center reply may be an automated message such as, for example, "your message has been received," or the call center reply may be selected based on the content of the pre-connection user information. In another embodiment, the call center parses the pre-connection user information and routes the call to a destination responsive to the contents of the pre-connection user information.

Method 400 ends at block 465.

Figure 5:
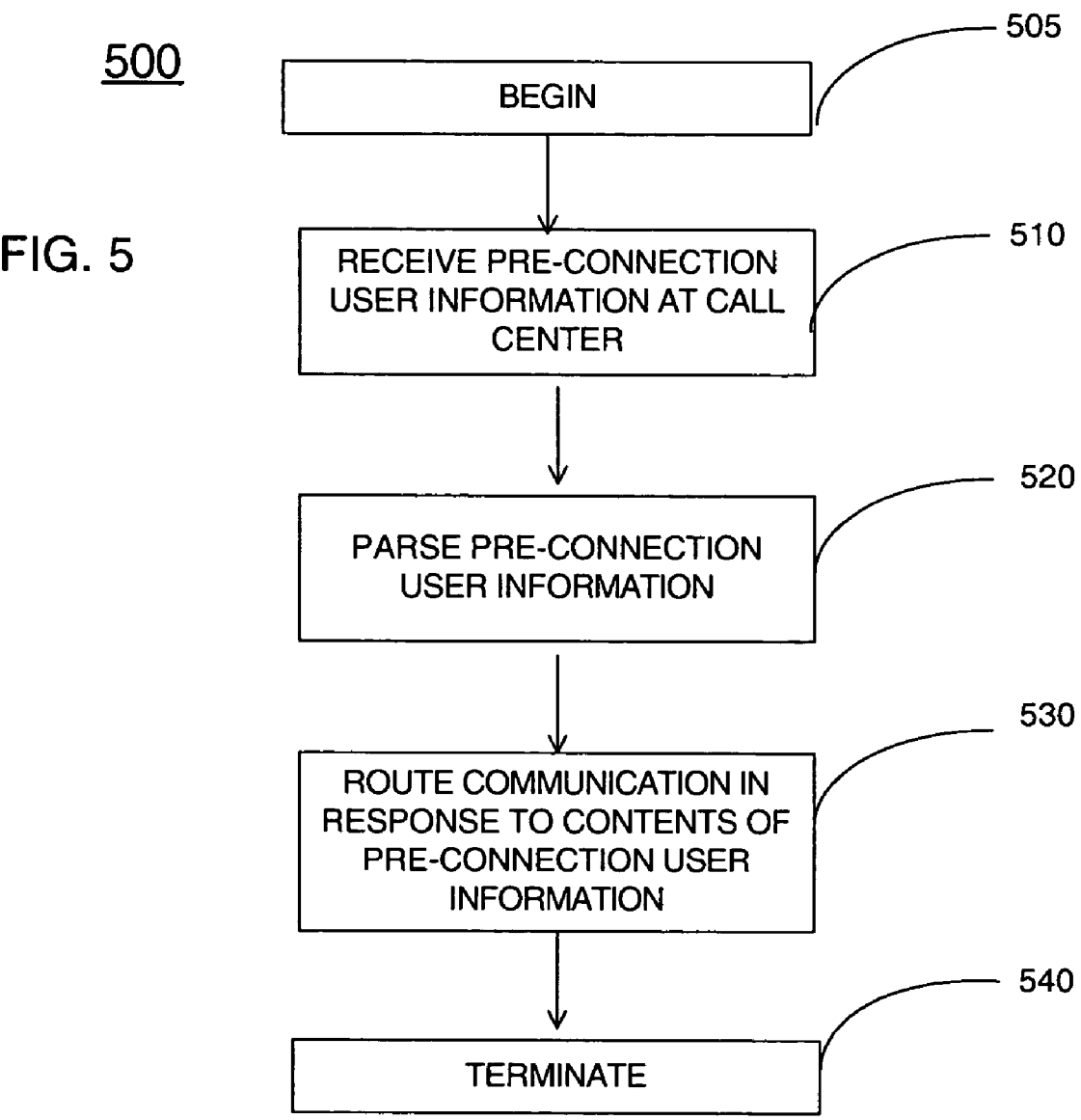
FIG. 5 illustrates one embodiment of a method of establishing a connection between a telematics unit and a call center, in accordance with one embodiment of the invention.

FIG. 5 illustrates an embodiment of a method 500 to receive communications between a telematics unit and a call center in accordance with one aspect of the invention.

Method 500 begins at block 505. At block 510, pre-connection user information is received at a call center, as in block 450, illustrated in FIG. 4.

After receiving the pre-connection user information, the call center parses the pre-connection user information during block 520. The call center may parse the pre-connection user information electronically or with human assistance. In one embodiment, the call center parses the pre-connection user information for certain key words from a predetermined list of key words.

At block 530, the pre-connection user information and the communication from the telematics unit are routed to a destination in response to the parsed contents of the pre-connection user information. For example, in one embodiment the list includes an entry of "tickets" to connect to a movie ticket ordering service. When the call center receives pre-connection user information comprising the word "tickets," the communication is routed to a ticket department. In another example, a user provides pre-connection user information including the word "weather," and the pre-connection user information is routed to a weather department.

Method 500 ends at block 540.

The present invention may be embodied in other specific forms without departing from its spirit or essential characteristics. The described embodiments are to be considered in all respects only as illustrative and not restrictive.

What is claimed is:

1. A system, comprising:
    a telematics unit; and
    a call center;
    wherein the telematics unit includes means for receiving and storing pre-connection user information after initiating a connection between the telematics unit and the call center but prior to establishing the connection between the telematics unit and the call center; and
    wherein the telematics unit and the call center include means for exchanging the received and stored pre-connection user information upon establishing the connection between the telematics unit and the call center.

2. The system of claim 1 wherein the pre-connection user information includes one or more voice commands.

3. The system of claim 2 wherein the exchange of the pre-connection user information between the telematics unit and the call center involves a speech to text conversion of the one or more voice commands.

4. The system of claim 2 wherein the exchange of the pre-connection user information between the telematics unit and the call center involves an audio playback of the pre-connection user information by the call center.

5. The system of claim 2 wherein the exchange of the pre-connection user information between the telematics unit and the call center involves a routing of the connection to an appropriate advisor of the call center.

6. The system of claim 1 wherein the pre-connection user information includes one or more computer data commands in the form of electronic data signals.

7. The system of claim 6 wherein the exchange of the pre-connection user information between the telematics unit and the call center involves a data retrieval by the call center of the pre-connection user information from the telematics unit.

8. A method of establishing a connection between a telematics unit and a call center, the method comprising:
    initiating a connection from the telematics unit to the call center;
    receiving and storing pre-connection user information after the connection is initiated but prior to establishing the connection; and
    transmitting the received and stored pre-connection user information to the call center upon establishing the connection.

9. The method of claim 8 wherein the pre-connection user information includes one or more voice commands.

10. The method of claim 8 wherein the pre-connection user information includes one or more computer data commands in the form of electronic data signals.

11. The method of claim 8 further comprising:
    receiving the transmitted pre-connection user information; and
    transmitting a call center reply responsive to the received pre-connection user information.

12. The method of claim 11 wherein the call center reply is selected in response to the content of the pre-connection user information.

13. The method of claim 8 wherein the stored pre-connection user information is stored in memory until overwritten by new pre-connection user information.

14. The method of claim 8 further comprising:
    transmitting the pre-connection user information to an advisor.

15. The method of claim 14 wherein the method of transmitting the pre-connection user information to an advisor is selected from the group consisting of replicated audio playback, display on a screen dialog box, display on a screen dialog box involving a speech-to-text conversion, data transfer, and operation of interactive voice response system.

16. The method of claim 8 further comprising:

receiving the transmitted pre-connection user information;

parsing the received transmitted pre-connection user information to determine the contents of the pre-connection user information; and routing the communication to a destination in response to the contents of the pre-connection user information.

17. A method of communicating from a telematics unit to a call center comprising:

initiating a connection from the telematics unit to the call center;

receiving and storing pre-connection user information after the connection is initiated but prior to establishing the connection;

transmitting the received and stored pre-connection user information to the call center upon establishing the connection;

receiving a communication including the pre-connection user information at the call center;

parsing the pre-connection user information to determine the contents of the pre-connection user information; and routing the communication in response to the contents of the pre-connection user information.

18. The method of claim 17 wherein the pre-connection user information includes one or more voice commands.

19. The method of claim 17 further comprising:

transmitting a call center reply responsive to the contents of the pre-connection user information.

\* \* \* \* \*